June 14, 1966    G. C. DEWEY ETAL    3,256,519
GROUND BASED MISS DISTANCE COMPUTER
Filed Nov. 29, 1963    2 Sheets-Sheet 1
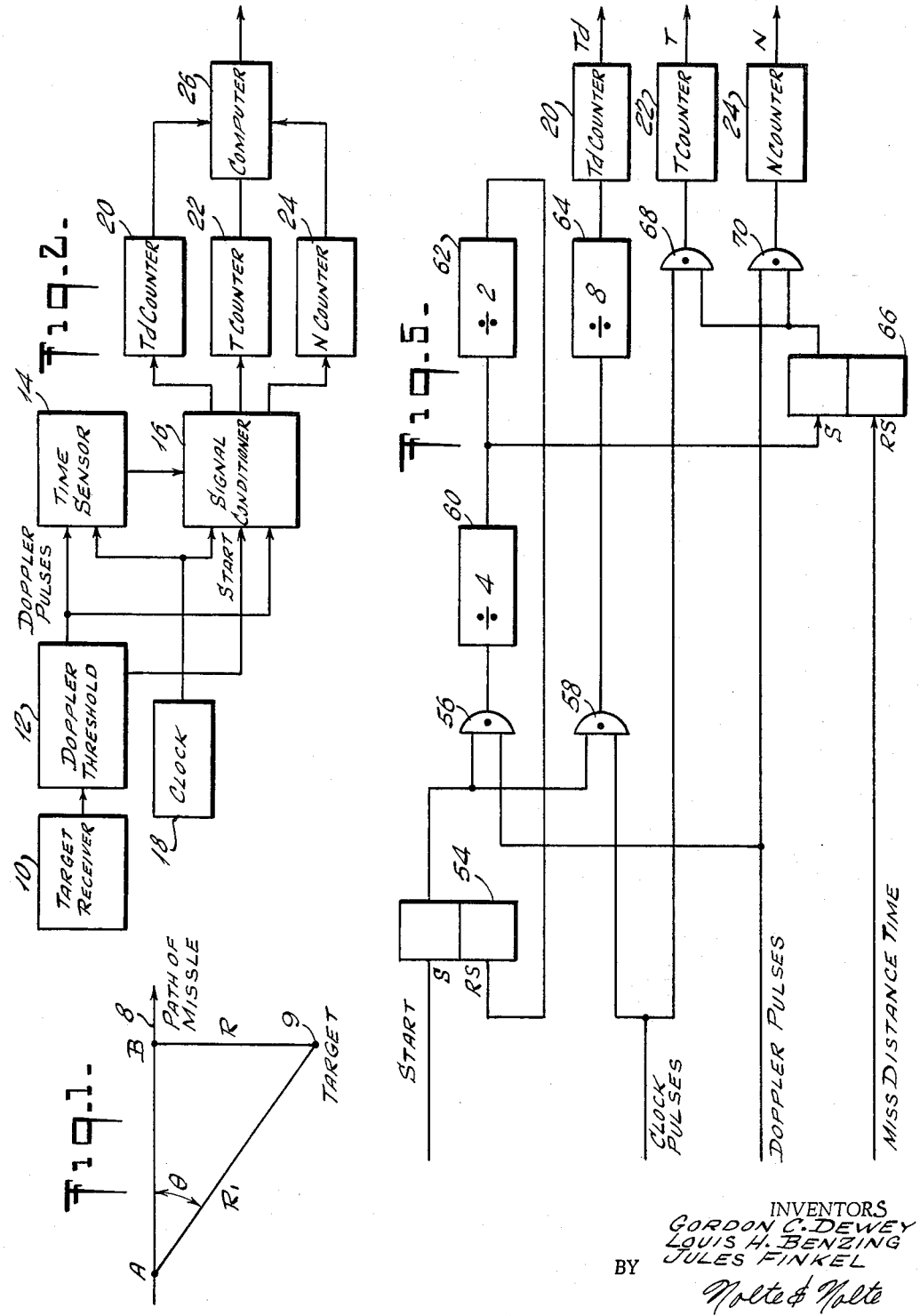
INVENTORS
GORDON C. DEWEY
LOUIS H. BENZING
JULES FINKEL
BY Nolte & Nolte
ATTORNEYS

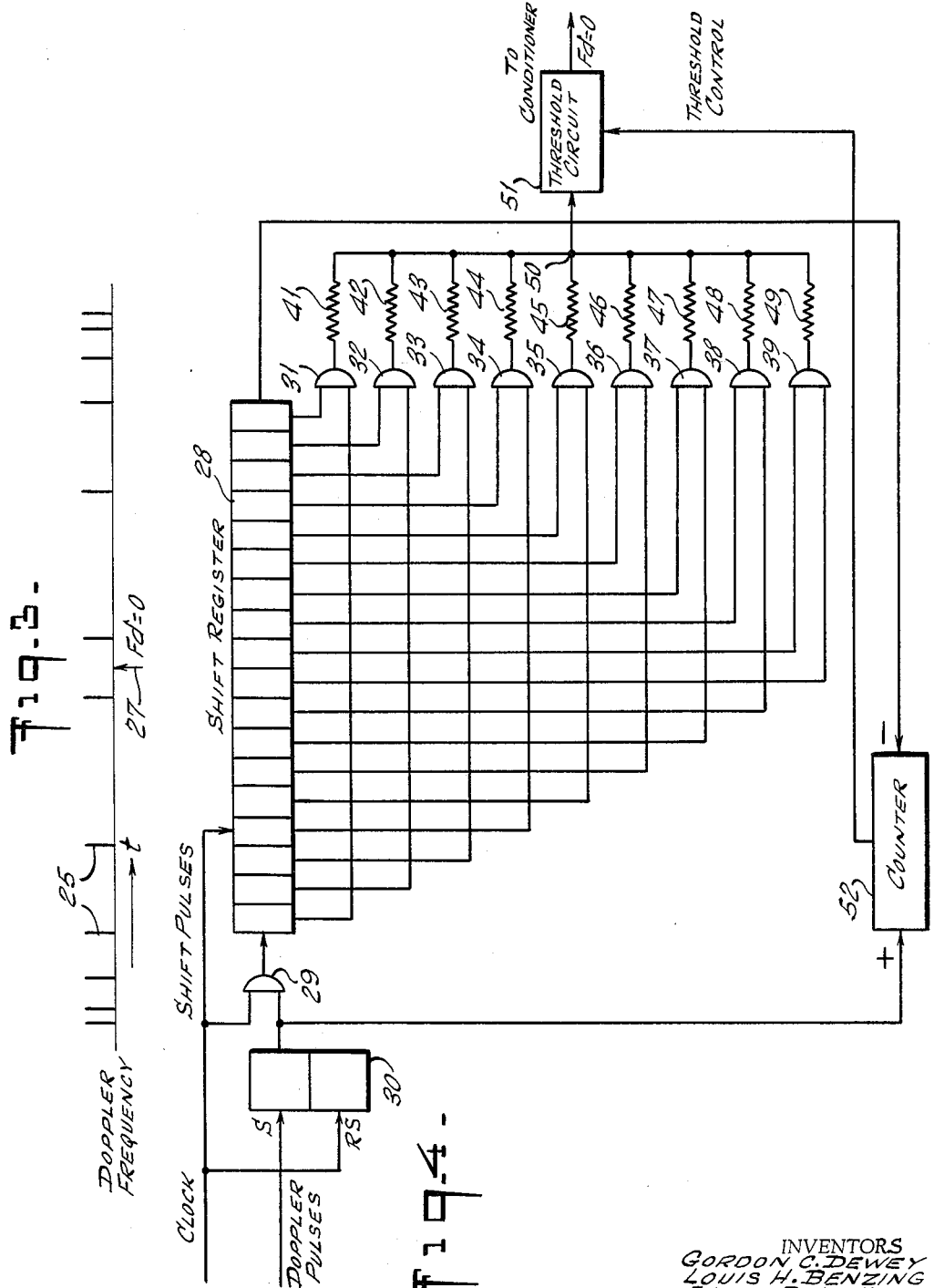

United States Patent Office 3,256,519
Patented June 14, 1966

3,256,519
GROUND BASED MISS DISTANCE COMPUTER
Gordon C. Dewey, New York, N.Y., Louis H. Benzing, Leonia, N.J., and Jules Finkel, West Hempstead, N.Y., assignors to The G. C. Dewey Corporation, New York, N.Y., a corporation of New York
Filed Nov. 29, 1963, Ser. No. 331,333
3 Claims. (Cl. 343—12)

The present invention relates to apparatus for indicating the distance by which a missile, or the like has missed a predetermined target. Such distance is hereinafter referred to as the miss distance. More particularly, this invention relates to apparatus, operating in accordance with Doppler principles, for indicating the time when a missile is closest to its target, and computer apparatus for utilizing such information to indicate the extent of the miss distance.

The present production of various types of missiles necessitates the manufacture of convenient testing apparatus for measuring their accuracy. For testing purposes, the missiles are normally aimed at targets which may be located thousands of miles away, and for obvious reasons, it is important to have an extremely accurate indication of the extent to which the missile has missed the target. Devices for measuring this distance are known in the art as miss distance computers, and the main object of this invention is to provide an improved miss distance computer.

Another object of the invention is to provide a new method by which the distance a missile has missed its target may be measured.

In accordance with the invention, a radar transmitter and receiver unit is located in the target, and adapted to generate Doppler signals dependent upon the velocity of the missile with respect to the target. The number of Doppler cycles is counted between an arbitrary point and the point at which the missile is closest to the target, i.e., the miss distance. The miss distance can be equated to the carrier frequency, the average Doppler period at such arbitrary point, the number of Doppler cycles, and the time required for the missile to move between the two points. To determine the three latter values, it is necessary to identify the time at which the missile is at the miss distance from the target (the miss distance time). Accordingly, it is another object of this invention to accurately determine this time, as well as three above mentioned values to enable computation of the miss distance.

In accordance with the invention, the miss distance time is determined by feeding the Doppler pulses occurring after the arbitrary point has been reached into a register under the control of a constant clock pulse source. The contents of the register are analyzed by a plurality of output gates to determine when the information stored in the first half of the register is the mirror image of the data stored in the second half of the register. When the comparison occurs it indicates that the miss distance time has been passed, and the number of clock pulses and Doppler pulses received during that entire interval may be counted to indicate the desired values.

The manner in which the above and other objects of the invention are accomplished will be described in greater detail below with reference to the following drawings wherein:

FIGURE 1 is a schematic illustration of the missile path and target to explain the principles of the invention;

FIGURE 2 is a block diagram of the entire miss distance computer;

FIGURE 3 is an illustrative representation of the received Doppler pulses with respect to time;

FIGURE 4 is a block diagram of the miss distance time sensor;

FIGURE 5 is a block diagram of the signal conditioner which is responsive to the output of the miss distance time detector for feeding the desired values to the computer.

In FIGURE 1, the path of the missile is indicated by the arrow 8, and the location of the target by point 9. A point on path 8, indicated as A, is arbitrarily chosen, while B represents the point at which the missile is closest to the target. $R_1$ is the distance between A and the target, and the angle $\theta$ the angle between $R_1$ and the path of the missile, as shown. It is desired to compute the miss distance R.

Attached to the end of the specification, under the heading "Appendix" are the equations showing the derivation of miss distance R. In accordance therewith, the following equation may be derived for miss distance:

$$R = \frac{\lambda/4}{\dfrac{1/N}{T/2 - \left(T - \dfrac{Td}{1/N}\right)}}{T - \dfrac{Td}{1/N}}$$

Wherein
N equals the number of Doppler cycles from A to B;
T is the time corresponding to N;
$Td$ is the average Doppler frequency period at A; and
$\lambda$ is the transmitted wave length, which is known.

FIGURE 2 is a block diagram of the overall system. The radar transmitter and receiver are located at the target and comprise known circuits capable of producing Doppler pulses, the frequency of which is dependent upon the relative speed of the missile with respect to the target. Thus, the echos from the missile are received by a receiver 10 and fed to a Doppler threshold circuit 12 which, in a known manner, produces an output when the amplitude of the Doppler pulses exceeds a predetermined threshold. In this manner the arbitrary point A is selected when the missile is within reflection range of the target's radiated signals. The incoming Doppler frequency is thereafter converted to a pulse train (one pulse per cycle) and coupled to a time sensor 14 and signal conditioner 16. The operation so far described is known.

The output of sensor 14 (as explained herein below with reference to FIGURE 3), is a pulse occurring at a time when the missile has passed the miss distance point B by a distance equal to the distance between points A and B. Conditioner circuit 16 receives the Doppler pulses from Doppler threshold circuit 12 together with timing pulses from a clock pulse generator 18 (e.g., a crystal controlled oscillator) to produce three outputs which are fed, respectively, to a $Td$ counter 20, a T counter 22, and an N counter 24. Counter 20 stores an indication of the average Doppler period about point A. The count in the T counter 22 is equal to twice the number of clock pulses received between points A and B, and the count in N counter 24 is equal to twice the number of Doppler cycles from A to miss distance point B.

The outputs of the three counters are then fed to a computer 26 which, in a known manner, computes the value of R in accordance with the above equation. Since the miss distance is also dependent upon the transmitted wave length of the radar signal, this value may be fed into the computer by means of switches or the like. In accordance with conventional practices, the output of computer 26 may be punched on an output record for checking purposes, and the time or test number of each shot tabulated with each data set for further identification. The miss distance may also be displayed on a Nixie type display.

FIGURE 3 is a diagram showing the incoming Doppler pulses with respect to time. The Doppler pulses, indicated at 25, have a high frequency at point A, diminishing to zero at the time indicated by arrow 27 (the miss distance time), and then increasing again to a higher frequency, whereby the mirror image of the pulses to the left of arrow 27 is the image of the pulses to the right of the arrow. Hence, by searching for the mirror image of the received Doppler pulses, the miss distance time may be identified by recognition of the time when the Doppler frequency is zero. Such recognition will occur at a time delayed from the actual miss distance time, and a corresponding number of Doppler cycles later.

A system designed to perform the necessary recognition process is illustrated in FIGURE 4, which is a block diagram of sensor unit 14. Sensor unit 14 includes a shift register 28 which is responsive to input pulses from clock pulse generator 18 through an AND gate 29. AND gate 29 is enabled by a flip-flop 30, whose set input is coupled to the output of Doppler threshold circuit 12. The input pulses coupled to the register through gate 29 are shifted through the register under the control of shifting pulses, which in this case are also derived from clock pulse generator 18. The operation of shift registers is well known, and will not herein be further described. The clock pulses also reset flip-flop 30 so that this flip-flop is in its reset state upon receipt of a Doppler pulse on its set input. By way of example, the clock pulses may occur once every two hundred micro-seconds, but this interval obviously may be varied considerably depending upon the frequencies employed and the desired resolution accuracy.

In operation, a Doppler pulse sets flip-flop 30 and thus enables gate 29, so that when a clock pulse occurs, it is coupled through gate 29 into the first stage of shift register 28. At the same time, the clock pulse shifts the data previously stored in the shift register one stage to the right and resets flip-flop 30 so that the flip-flop is ready to receive the next Doppler pulse. The clock pulses, at a higher frequency than the Doppler pulses, continue to shift the data down the register, with the lack of a Doppler pulse being indicated by a stored zero.

The stages of the shift register are connected in parallel to a plurality of AND gates 31 to 39 to indicate when the spectrum of Doppler pulses stored in the second half of the shift register is the mirror image of the pulses stored in the first half. In the illustrated embodiment, shift register 28 includes eighteen stages. Thus, AND gate 31 is connected to the first and eighteenth stages, AND gate 32 is connected to the second and seventeenth stages, and so forth, the last gate 39 being connected to the ninth and tenth stages of the register.

It is unlikely, as a practical matter, that an exact correlation will ever be achieved, and thus it is necessary to include a threshold device which will enable an output when a reasonable number of comparisons has been made. Toward this end, the outputs of gates 31 to 39 are coupled to respective summing resistors 41 to 49, having a common junction 50 at which a voltage proportional to the number of identified comparisons appears. This summation voltage is compared in a variable threshold circuit 51 with the output of a counter 52 whose stored count is indicative of the number of Doppler pulses stored at that moment in shift register 28. Counter 52 is a reversible counter which adds a count of "one" for every Doppler pulse read into shift register 28, and which subtracts a count of "one" for every Doppler pulse shifted out of the last stage of the register. Threshold circuit 51 may be a conventional Schmitt trigger with a variable threshold controlled by the output of counter 52. When the set threshold has been exceeded, threshold circuit 51 produces an output signal indicating that the miss distance, the point at which the Doppler frequency equals zero, has been located.

The operation of the circuit should be clear from the above description. As the various Doppler pulses are shifted into register 28, they are counted by counter 52 which sets threshold circuit 51. When AND gates 31 to 39 recognize a sufficient number of identities to produce a summation voltage at junction 50 exceeding the set threshold, an output pulse is produced indicating that the mirror images coincide and that the miss distance point B has been located.

The signal conditioner 16 is responsive to the output of sensor 14, the received Doppler pulses, and the clock pulses for providing signals to counters 20, 22, and 24 indicative of the average Doppler period at point A, the time of flight from A to miss distance point B, and the number of Doppler cycles from A to B.

A signal from Doppler threshold circuit 12 indicating that the threshold of the received Doppler signals has been exceeded, is fed to the set input of a flip-flop 54. Flip-flop 54, in its set condition, enables AND gates 56 and 58. The Doppler pulses are coupled through AND gate 56 to a "divide-by-four" counter 60 in series with a "divide-by-two" counter 62, the output of which is coupled to the reset input of flip-flop 54. Thus, flip-flop 54 is reset after eight Doppler pulses have been received to remove the enabling input from gates 56 and 58.

Gate 58, while it is enabled, passes clock pulses through a "divide-by-eight" counter 64 to the Td counter 20 to store an indication of the average Doppler period about point A. Since gate 58 is only open during receipt of the first eight Doppler pulses after point A has been reached, the number of clock pulses passed through gate 58 divided by eight (in counter 64), provides an indication of the average Doppler period, since the interval between clock pulses is known. Thus, the count in counter 20 times the clock pulse interval (e.g., 200 μsec.) equals the average Doppler period.

The output of "divide-by-four" counter 60 is coupled to the set input of flip-flop 66, which, when set, enables a pair of AND gates 68 and 70. AND gates 68 and 70 are responsive to clock pulses and Doppler pulses, respectively, to provide indications of the time duration required for the missile to traverse the distance between points A and B, and the number of Doppler pulses received during that interval. Since the average of eight Doppler pulses is taken to determine the average Doppler period around point A, it is necessary to delay the start of the count until four Doppler pulses have been received so that point A occurs in the "center" of the sampled Doppler pulses. In this respect, point A, which is arbitrary, does not actually occur until four Doppler pulses have been received after Doppler threshold circuit 12 has detected the threshold signals.

Gate 68, after it has been enabled by the fourth Doppler pulse, passes clock pulses to T counter 22. Gate 70, after it is enabled passes successive Doppler pulses to N counter 24 to provide an indication of the number of Doppler pulses received. Flip-flop 66 is reset by the miss distance pulse produced by sensor 14, as explained above, upon detection of the mirror image of the received Doppler pulses. When flip-flop 66 is reset the enabling input is removed from gates 68 and 70, preventing the application of additional pulses to counters 22 and 24. Since the gates 68 and 70 remain open until sensor 14 closes them, counters 22 and 24 count their respective input pulses during a period of time which is actually twice that required for the missile to move from point A to the miss distance point B. It is thus only necessary to subtract half the stored count from the respective counters to obtain the desired information. This function is performed by computer 26 in a known and simple fashion. Since all of the factors of the equation for the miss distance are now known, the computer makes the necessary determinations and displays the desired information in a conventional manner.

The equation is relatively easy to mechanize with digital circuitry: only two operations are needed—subtraction and division. The arithmetic operations may be performed using binary numbers. Since relatively long periods (as judged by digital computation speeds) are available to solve the miss distance equation, serial arithmetic logic can be used. Two additional registers, in conjunction with the T, Td, and N register counters, may be used for storage of the partial answers in the computation, and the result may be stored in one of these additional registers.

Although a preferred embodiment of the invention has been illustrated and described, many modifications thereof will be obvious to those skilled in the art. For example, the Doppler frequency may be recorded on tape, in which case the clock might also be recorded on the tape. This would make playback insensitive to wow and flutter and other eccentricities and their effect on overall computing accuracy.

*Appendix.—Mathematical analysis with reference to FIGURE 1*

N = number of Doppler cycles counted as missile travels from A to B
$f_o$ = Doppler carrier frequency
$f_d$ = Doppler frequency measured when missile is at A
T = time required for missile to travel from A to B
v = missile velocity
R = miss distance
$R_1$ = range when missile is at point A
$\theta$ = angle defined in figure
$\lambda$ = wavelength of Doppler carrier wave $$F_d = \frac{2f_o v}{c} \cos \theta \quad (1)$$

$$\cos \theta = \frac{\overline{AB}}{R_1} \quad (2)$$

$$\overline{AB} = vT \quad (3)$$

Therefore:

$$F_d = \frac{2f_o v}{c} \frac{vT}{R_1} \quad (4)$$

$$tF_d = v^2 T^2 \frac{2f_o}{cR_1} \quad (5)$$

Or, rearranging:

$$v^2 T^2 = \frac{F_d T c R_1}{2f_o} \quad (6)$$

Also:

$$N = \frac{2f_o}{c}(R_1 - R) \quad (7)$$

or, $$R_1 = \frac{Nc}{2f_o} + R \quad (8)$$

From the geometry, $$\overline{AB}^2 + R^2 = R_1^2 \quad (9)$$

Substituting from (3):

$$(vT)^2 + R^2 = R_1^2 \quad (10)$$

Substituting from (6):

$$\frac{T F_d c R_1}{2f_o} + R^2 = R_1^2 \quad (11)$$

Substituting for $R_1$ from (8):

$$\left(\frac{TF_d c}{2f_o}\right)\left(\frac{Nc}{2f_o}\right) + R = R^2 = \left(\frac{Nc}{2f_o} + R\right)^2 \quad (12)$$

Substituting $$\lambda = \frac{c}{f_o}$$

and expanding:

$$\frac{T F_d N}{4}\lambda^2 + \frac{T F_d}{2}\lambda R + R^2 = \frac{N\lambda^2}{2} + RN\lambda + R^2 \quad (13)$$

Rearranging:

$$R = \left[\frac{\frac{TF_d N\lambda^2}{4} - \frac{N^2\lambda^2}{4}}{N\lambda - \frac{TF_d \lambda}{2}}\right] \quad (14)$$

$$R = \frac{N\lambda}{2}\left\{\frac{\lambda T F_d - N\lambda}{2N\lambda - \lambda T F_d}\right\} \quad (15)$$

$$R = \frac{N\lambda}{2}\left\{\frac{TF_d - N}{2N - TF_d}\right\} \quad (16)$$

For the purpose of mechanizing the equation, further manipulation is helpful:

$$R = \frac{N\lambda}{4}\left[\frac{T - \frac{N}{F_d}}{\frac{N}{F_d} - \frac{T}{2}}\right] \quad (17)$$

$$R = \frac{N\lambda}{4}\left\{\frac{T - \frac{N}{F_d}}{\frac{T}{2} - \left(T - \frac{N}{F_d}\right)}\right\} \quad (18)$$

$$R = \left(\frac{\lambda}{4}\Big/\frac{1}{N}\right) \frac{T - \frac{1}{F_d}\Big/\frac{1}{N}}{\frac{T}{2} - \left(t - \frac{1}{F_d}\Big/\frac{1}{N}\right)} \quad (19)$$

Let $$\frac{1}{F_d} = T_d \quad (20)$$

$$R = \left(\frac{\frac{\lambda}{4}}{\frac{1}{N}}\right)\left[\frac{T - \frac{T_d}{\frac{1}{N}}}{\frac{T}{2} - T - \frac{T_d}{\frac{1}{N}}}\right] \quad (21)$$

$$R = \frac{\frac{\lambda}{4}}{\frac{1}{N}} \cdot \frac{T - \frac{T_d}{1}}{\frac{T}{2} - \left[T - \frac{T_d}{\frac{1}{N}}\right]} \quad (22)$$

We claim:
1. A device for indicating when the distance between a moving object and a target is at a minimum, comprising means for producing Doppler frequency signals dependent upon the relative velocity between said object and target, comparison means for comparing approaching and receding Doppler cycles, said comparison means including a register for receiving said Doppler signals and gating means for indicating when said signals are the same, and output means connected from said comparison means for indicating that said minimum distance has been reached, said output means comprising threshold means coupled to the output of said gating means and responsive to the number of received Doppler pulses, wherein said comparison means includes a register for receiving said spectra, and gating means for indicating when said spectra are the same, and said output means comprise threshold means coupled to the output of said gates and responsive to the number of received Doppler pulses.

2. A miss distance computer for indicating the distance by which a missile has missed a target, comprising a radar transmitter located in said target, radar receiver means in said traget for receiving the pulses reflected from said missile and producing Doppler pulses in response thereto, a threshold circuit operative when said Doppler pulses exceed a predetermined level, a miss distance time sensor coupled to the output of said threshold circuit and receiving said Doppler pulses from said threshold circuit, said sensor providing an output when said miss distance has been reached signal conditioner, a clock pulse generator feeding clock pulses to said distance time sensor and to said signal conditioner, said signal conditioner being responsive to the output of said sensor, clock pulse generator, and Doppler threshold circuit for producing signals indicative of the time interval between the occurrence of outputs from said Doppler threshold circuit and said sensor circuit, the number of Doppler pulses received in said interval, and the average value of the Doppler frequency period about a predetermined arbitrary point.

3. A miss distance computer according to claim 2, including counter means for storing indications of said last named signals and computer means coupled to the output of said counter means for indicating said miss distance.

References Cited by the Examiner

UNITED STATES PATENTS 3,168,735   2/1965   Cartwright _____ 343—12

CHESTER L. JUSTUS, *Primary Examiner.*

R. E. KLEIN, *Assistant Examiner.*